US006673871B2

(12) United States Patent
Warneke et al.

(10) Patent No.: US 6,673,871 B2
(45) Date of Patent: Jan. 6, 2004

(54) ELASTOMERIC ARTICLES MADE FROM A SYNTHETIC POLYMER

(75) Inventors: Derek Warneke, Carlsbad, CA (US); Jali Williams, Songkhla (TH)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 183 days.

(21) Appl. No.: 09/745,187

(22) Filed: Dec. 21, 2000

(65) Prior Publication Data

US 2002/0114943 A1 Aug. 22, 2002

(51) Int. Cl.$^7$ .................................................. C08F 8/00
(52) U.S. Cl. .............................. 525/331.7; 525/332.8; 525/332.9; 525/333.1; 525/333.2; 525/368; 525/372; 525/373
(58) Field of Search ............................ 525/331.7, 332.8, 525/332.9, 333.1, 333.2, 368, 372, 373

(56) References Cited

U.S. PATENT DOCUMENTS

| 2,395,506 A | * | 2/1946 | Sauser ..................... 525/332.5 |
| 2,868,754 A | | 1/1959 | Eilbeck et al. |
| 5,084,514 A | | 1/1992 | Szczechura et al. |
| 5,112,900 A | | 5/1992 | Buddenhagen et al. |
| 5,284,157 A | | 2/1994 | Miller et al. |
| 5,326,828 A | | 7/1994 | Rowland et al. |
| 5,407,715 A | | 4/1995 | Buddenhagen et al. |
| RE35,616 E | | 9/1997 | Tillotson et al. |
| 5,900,451 A | | 5/1999 | Krishnan et al. |
| 5,910,533 A | | 6/1999 | Ghosal et al. |
| 5,997,969 A | | 12/1999 | Gardon |
| 6,031,042 A | | 2/2000 | Lipinski |

FOREIGN PATENT DOCUMENTS

| EP | 0419155 | 3/1991 |
| WO | WO 9634043 | 10/1996 |
| WO | WO 9854250 | 12/1998 |
| WO | WO 9906481 | 2/1999 |

\* cited by examiner

*Primary Examiner*—Bernard Lipman
(74) *Attorney, Agent, or Firm*—Dority & Manning, P.A.

(57) ABSTRACT

Elastomeric articles, such as gloves and condoms, are disclosed including a process for making the articles. The elastomeric articles produced according to the present invention are made from a synthetic polymer. During production of the articles, the polymer is cross-linked using a metal oxide as a cross-linking agent. In one embodiment, the polymer is cross-linked without using conventional sulfur-containing cross-linking agents or accelerators.

18 Claims, 2 Drawing Sheets

ELASTOMERIC ARTICLES MADE FROM A SYNTHETIC POLYMER

BACKGROUND OF THE INVENTION

Thin-walled, extensible articles such as gloves and other medical products have long been made from natural latex polymers. Typically, such articles are formed from natural rubber latex, a naturally occurring emulsion of polymer and water, with added stabilizing agents and vulcanizing chemicals. In order to produce the articles, a former having the shape of the article to be formed is first coated with a coagulating solution. After the coagulating solution is applied, the former is dipped into a latex mixture once or several times to build up a layer of the desired thickness. The film is allowed to dry and then vulcanized to provide adequate mechanical and physical properties.

Natural latex polymers have many advantages in these applications, being strong and highly elastic and having good overall tactile properties. The good tactility is believed to be a result of the natural latex having low deformation stress at ten to five hundred percent elongations and high elastic recovery.

Even though natural latex offers various advantages, those skilled in the art have been attempting to create an extensible article from synthetic polymers that have physical properties similar to natural latex. In this regard, various types of synthetic elastomeric polymer products have been developed for use in thin articles produced by dip forming. For example, nitrile polymers are commonly used for this purpose. Further, U.S. Pat. Nos. 5,112,900 and 5,407,715 both disclose elastomeric triblock copolymer compositions for producing elastomeric articles. Both of the above patents are incorporated herein by reference.

The various synthetic polymer compositions that have been developed to date have properties very comparable to natural latex polymers. Further, articles formed from the synthetic compositions have been found to possess very uniform film thicknesses without an appreciable formation of pinholes.

A need still remains, however, for improved elastomeric articles, such as gloves, that are made from other types of synthetic polymers. The present invention fulfills this need, and further provides related advantages.

SUMMARY OF THE INVENTION

In general, the present invention is directed to elastomeric articles, such as gloves and condoms. The articles are made from a thin film having elastic properties. The film is produced from a synthetic polymer. The synthetic polymer can be, for instance, BARRIERPRO BP 2000 sold by Riechold Chemicals, Inc. BARRIERPRO BP 2000 contains TYLAC 68080 polymer.

According to the present invention, the synthetic polymer is cross-linked with a metal oxide cross-linking agent. The cross-linking agent, for instance, may be zinc oxide, magnesium oxide, cadmium oxide, and the like. The cross-linking agent can be present in the polymer in an amount from about 0.25 PHR to about 3 PHR. (Parts per hundred rubber).

Of particular importance, the present inventors discovered that elastomeric articles can be formed from the above-described polymers without using conventional sulphur-containing cross-linking agents and accelerators. In fact, the use of an accelerator is not required. In the past, when using sulphur-containing cross-linking agents and accelerators, the polymer typically had to be cured at temperatures greater than about 130° C. When using a metal oxide as the cross-linking agent, however, the synthetic polymer emulsion can be cured at temperatures less than about 120° C., particularly at temperatures less than 100° C. and more particularly at temperatures less than 85° C.

The resulting polymer is sulfur-free. As used herein, the term "sulfur-free" is defined as a polymer or a polymer emulsion that contains no measurable amounts of elemental sulphur or sulfur compounds.

In producing elastomeric articles in accordance with the present invention, such as gloves and condoms, a former in a desired shape is first preheated. Once preheated, the former is dipped or immersed into a coagulant bath. The former is withdrawn from the coagulant bath and then dried leaving a coagulant, such as calcium nitrate, on the surface of the former.

Next, the former is dipped into a polymer emulsion. In accordance with the present invention, the emulsion contains a synthetic polymer, water, and a metal oxide cross-linking agent, such as zinc oxide. The coagulant-coated former is dipped or immersed into the emulsion and withdrawn leaving a coating of the polymer emulsion on the former. The polymer coating on the former is then polymerized and dried at temperatures less than about 130° C., particularly at temperatures less than about 100° C.

Once the polymer coating is dried on the former, the elastomeric article can be removed from the former or the former can be once again dipped into the emulsion for increasing the thickness of the coating.

Other features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

DETAILED DESCRIPTION

Figure 1:
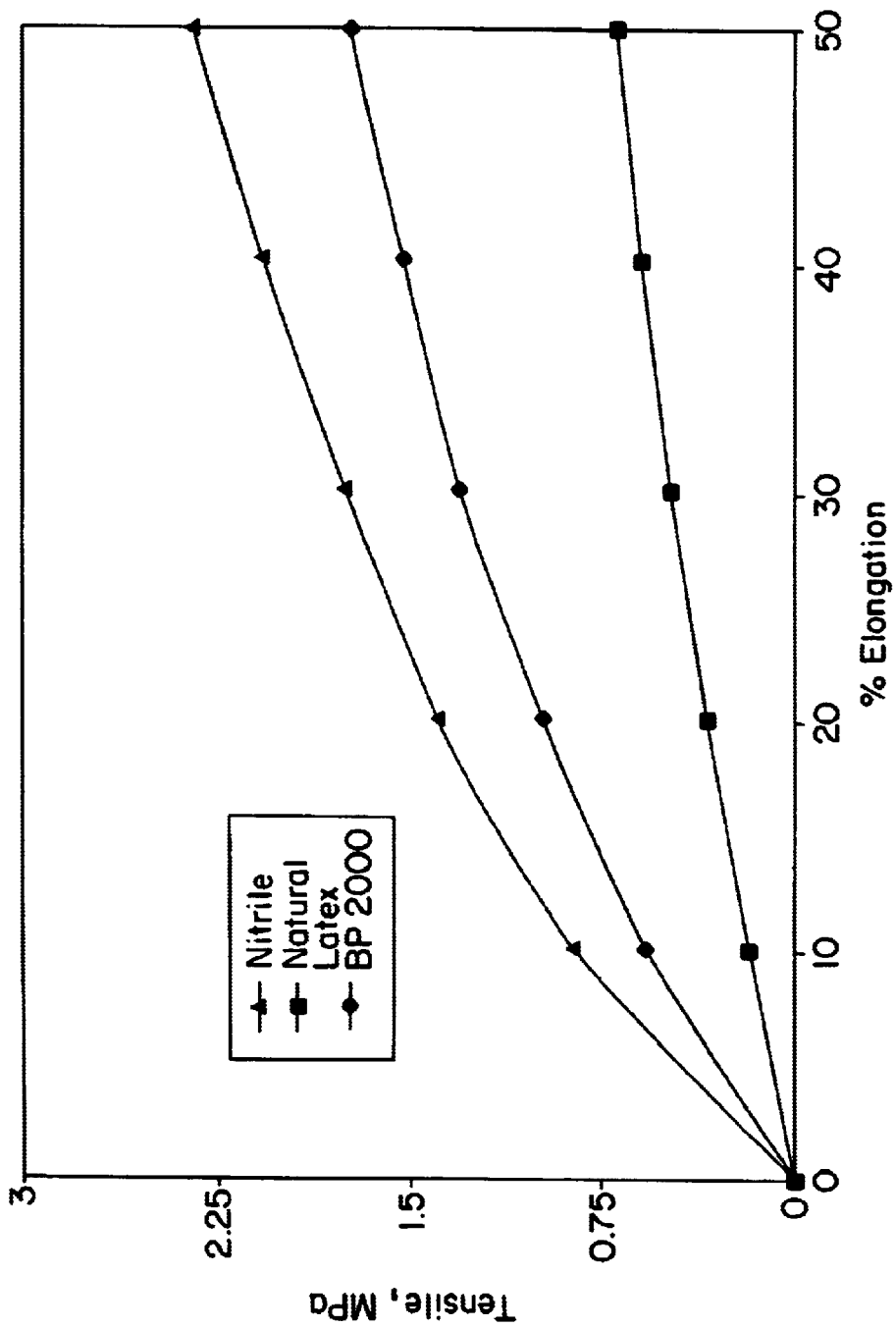
FIGS. 1 and 2 are a graphical representation of the results obtained in the Example discussed below.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

The present invention is generally directed to highly elastic articles made from a synthetic polymer. The synthetic polymer is formed into a film for forming articles such as condoms and gloves. For example, gloves produced according to the present invention are well suited for use as surgical gloves, medical examination gloves, laboratory gloves, gloves worn during the manufacture of electronic components, besides various other types of gloves.

The synthetic polymer used in the present invention can be, for instance, BARRIERPRO BP 2000 marketed by Reichhold Chemicals, Inc. Such polymers have been used in the past to form elastomeric articles such as gloves. In the past, however, similar to nitrile polymers, these polymers were polymerized and cross-linked to form the articles using sulphur as a cross-linking agent and a compound containing sulphur as an accelerator. Particular accelerators used in the past included carbamates, such as zinc dibutyl dithiocarbamate.

Unfortunately, the use of conventional sulphur-containing cross-linking agents and accelerators requires relatively high temperatures to cure the polymer in forming the articles. For instance, in many conventional systems, the articles have to be cured at temperatures of from about 115° C. to about 130° C.

The present inventors, on the other hand, have discovered that the above-described polymers can be cured and cross-linked at lower temperatures using a metal oxide as the cross-linking agent. According to the present invention, a sulphur cross-linking agent and/or a sulphur-containing accelerator are not necessary to form the articles. By using a metal oxide as the cross-linking agent, the present inventors discovered that the polymer can be cross-linked and cured in forming elastomeric articles at substantially room temperature. More particularly, the polymer can be cured at temperatures less than about 100° C., particularly less than about 85° C., and in at least one embodiment, at a temperature from about 75° C. to about 85° C. Further, it was discovered that articles formed in accordance with the present invention have physical properties very comparable to natural rubber latex articles and to articles made from synthetic polymers, such as conventionally used nitrile polymers.

The process of the present invention offers various advantages and benefits over the prior art. As stated above, since the polymer is cured at lower temperatures, the process of the present invention has reduced energy requirements. Since sulphur cross-linking agents and accelerators are not used, the emulsification process for producing the elastomeric articles is simplified. Further, gloves and other articles made according to the present invention are generally less expensive to produce.

One embodiment of a process for producing elastomeric articles in accordance with the present invention will now be described in detail. The following process will be specific to the production of gloves. It should be understood, however, that various other elastomeric articles may be formed in accordance with the present invention.

As stated above, one commercially available copolymer that may be used in the present invention is a synthetic polymer marketed by Reichhold Chemicals, Inc. under the trade name BARRIERPRO BP 2000.

In accordance with the present invention, the synthetic polymer is combined with a metal oxide cross-linking agent. The cross-linking agent can be, for instance, cadmium oxide, magnesium oxide, zinc oxide and mixtures thereof. The amount of cross-linking agent combined with the polymer will depend upon the particular application. Of particular advantage, adding greater or lesser amounts of the metal oxide cross-linking agent will vary the properties of the resulting polymer. Thus, the amount of cross-linking agent added to the polymer can be varied in order to optimize the physical properties of the article to be formed. For many applications, the metal oxide cross-linking agent may be combined with the polymer in an amount from about 0.25 to about 3 PHR (parts per hundred parts rubber). In one particular embodiment, the cross-linking agent can be zinc oxide and may be combined with the synthetic polymer at a concentration of from about 1 PHR to about 2 PHR.

Besides a synthetic polymer and a metal oxide cross-linking agent, the polymer emulsion used to form articles in accordance with the present invention can also contain water. Specifically, the polymer emulsion can contain water in an amount such that the emulsion has a solids concentration of from about 25% to about 32%. Further, the emulsion desirably can be at a pH of at least 8.0, particularly at least 8.5, and more particularly at a pH of from about 8.5 to about 9.5. If necessary, any suitable pH adjuster can be added to the emulsion for raising or lowering the pH. For example, potassium hydroxide or ammonium hydroxide can be used to raise the pH.

Of particular advantage, the above ingredients can be combined together to form an emulsion at normal room temperatures. For instance, the emulsion can be formed at a temperature of less than about 50° C. particularly at a temperature of from about 20° C. to about 35° C.

In order to form elastomeric articles such as gloves from the above described polymer emulsion, first a former or mold in a desired shape is heated in an oven. When forming gloves, the former is in the shape of a hand. Once placed in an oven, the former is heated to a temperature of typically greater than 50° C. such as from about 55° C. to about 75° C. and more particularly from about 60° C. to about 71° C.

After the former is heated, the former is immersed or dipped into a coagulant. The coagulant causes the copolymer emulsion to coagulate and polymerize. Suitable coagulants that may be used in the present invention include a solution of a metal salt. For example, in one embodiment, calcium nitrate in water or alcohol is used. The calcium nitrate can be present in the solution in an amount of about 40% by weight.

Once immersed into the coagulant, the former is withdrawn and the coagulant present on the surface of the former is allowed to dry. For many applications, the coagulant can be air dried for a time of from about one minute to about two minutes. Once dried, a residual coating of the coagulant is left on the former.

Next, the former coated with the coagulant is then immersed or dipped into the synthetic polymer emulsion. Contacting the coagulant layer causes the polymer emulsion to coagulate and form a film on the former. The amount of time the former is immersed (commonly termed as dwell time) in the copolymer emulsion determines the thickness of the film. Increasing the dwell time of the former in the polymer causes the thickness of the film to increase. In one embodiment, the former can be dipped into the copolymer emulsion from about 15 seconds to about 30 seconds, and particularly for about 20 seconds.

Once the former is removed from the polymer emulsion, the polymer present on the surface of the former is dried and cured. Of particular advantage, the polymer will dry and cure at temperatures less than about 130° C., such as from about 35° C. to about 85° C.

After the polymer film is dried and cured, if desired, the former can once again be immersed or dipped into the polymer emulsion for increasing the thickness of the polymer layer. For example, in one embodiment, the former is dipped twice into the polymer emulsion for forming a total film thickness of from about 4 mil to about 5½ mil.

If desired, once the synthetic polymer layer is formed, the former can be dipped into other polymer solutions for forming other coatings on the article. For example, when forming gloves, other coatings can be placed on the glove for facilitating donning of the glove or, alternatively, for placing a coating on the glove that will later improve the gripping properties of the glove.

Once the article is formed on the former, the article is stripped from the former and further processed if desired. For example, in one embodiment, the formed article can be chlorinated. Chlorination typically includes the step of contacting the formed article with a solution containing chlorine or with a gas containing chlorine. During this step in the process, chlorine reacts with the outside surface of the formed article. Specifically, chlorination is used to decrease the tackiness of the glove.

The present invention may be better understood with reference to the following example.

EXAMPLE

The following example was conducted in order to compare the properties of a polymer film made in accordance with the present invention in comparison to other conventionally used polymer films. In particular, the modulus of a synthetic polymer film was compared with the modulus of a nitrile film, a natural latex film, and a polyvinyl chloride film.

In order to form the synthetic polymer film, a copolymer solution marketed under the trade name BARRIERPRO BP 2000 sold by Riechhold Chemicals, Inc. was combined with water, zinc oxide, titanium dioxide, and a blue pigment according to the following concentrations:

| Ingredient | Amount (kg) | PHR |
|---|---|---|
| BARRIERPRO BP 2000 polymer | 3300 | 100 |
| Titanium dioxide (50%) | 44.05 | 1.5 |
| Zinc Oxide (50%) | 29.37 | 1.0 |
| FLEXONYL blue pigment | 4.38 | 0.15 |
| Water | 2129 | |

During formation of gloves made from the above emulsion, a calcium nitrate solution was used as a coagulant.

Once the above glove was formed, a sample in the shape of a dumbbell was cut from the glove and tested for modulus (tensile strength v. percent elongation). Specifically, the sample was tested according to ASTM test no. D-412.

Similar samples were then cut from commercially available gloves. Specifically, a sample was cut from a glove made from a nitrile polymer, from a glove made from a natural latex polymer, and from a glove made from a vinyl chloride polymer. The nitrile glove used is a glove marketed by the Safeskin Corporation under the name PFE PURPLE NITRILE exam glove having catalogue numbers 55080–55084. The natural latex polymer glove used is also marketed by the Safeskin Corporation under the name PFE NATURAL LATEX exam glove having catalogue numbers 110–550.

Figure 2:
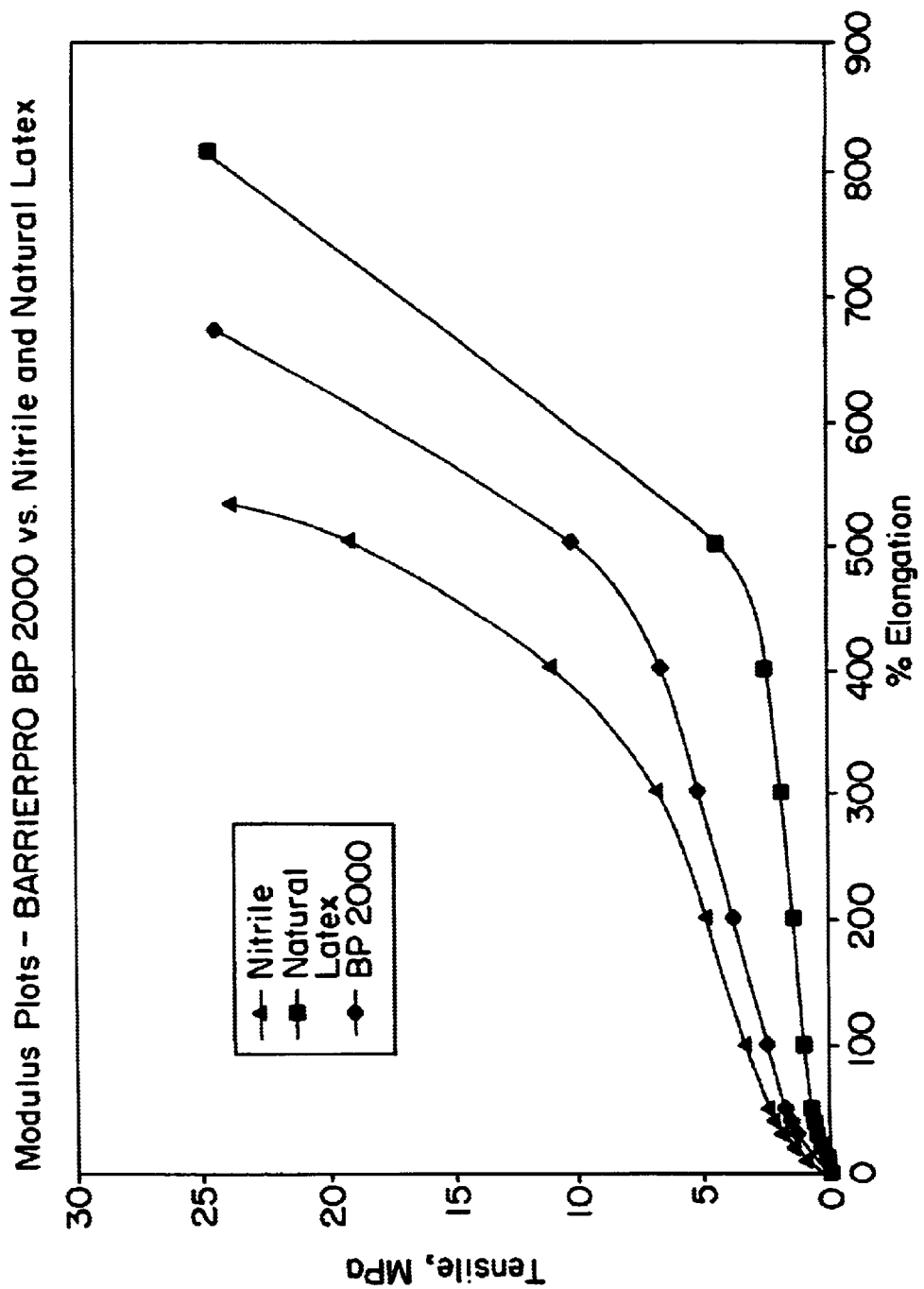

The modulus plots obtained are illustrated in FIGS. 1 and 2. As shown, the sample tested made from BARRIERPRO BP 2000 in accordance with the present invention compared favorably to the sample made from the nitrile polymer and the sample made from the natural latex polymer.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A glove comprising a thin elastomeric film, said film comprising a synthetic polymer, the synthetic polymer comprising a film forming polymer selected from the group of synthetic polymers capable of being crosslinked with sulfur, wherein the synthetic polymer has been crosslinked at a temperature of less than about 85° C. with a sulfur-replacing crosslinking agent, said crosslinking agent comprising a metal oxide.

2. A glove as defined in claim 1, wherein said crosslinking agent comprises zinc oxide.

3. A glove as defined in claim 1, wherein said crosslinking agent is present in said film in an amount from about 0.25 PHR to about 3 PHR.

4. A glove as defined in claim 1, wherein said film has a thickness of from about 4 mils to about 5.5 mils.

5. A glove as defined in claim 1, wherein said crosslinking agent consists essentially of said metal oxide.

6. A glove as defined in claim 1, wherein said crosslinking agent is free of sulfur.

7. A glove as defined in claim 1, wherein said crosslinking agent comprises a material selected from the group consisting of magnesium oxide and cadmium oxide.

8. A glove as defined in claim 1, further comprising a donning layer attached to said film, said donning layer for facilitating insertion of a hand into said glove.

9. A glove as defined in claim 1, wherein the exterior surface of said glove has been chlorinated.

10. An elastomeric article made from a thin elastomeric film, said elastomeric film comprising a synthetic polymer, the synthetic polymer comprising a film forming polymer selected from the group of synthetic polymers capable of being crosslinked with sulfur, wherein the synthetic polymer has been crosslinked at a temperature of less than about 85° C. with a sulfur-replacing cross-linking agent, said crosslinking agent consisting essentially of a metal oxide, said elastomeric film being sulfur-free.

11. An elastomeric article as defined in claim 10, wherein said article comprises a glove.

12. An elastomeric article as defined in claim 10, wherein said article comprises a condom.

13. An elastomeric article as defined in claim 10, wherein said cross-linking agent comprises zinc oxide.

14. An elastomeric article as defined in claim 10, wherein said cross-linking agent comprises a material selected from the group consisting of magnesium oxide and cadmium oxide.

15. An elastomeric article as defined in claim 10, wherein said cross-linking agent is present in said film in an amount from about 0.25 PHR to about 3 PHR.

16. An elastomeric article as defined in claim 10, wherein said synthetic polymer has been cross-linked without the use of an accelerator.

17. A glove comprising a thin elastomeric film, said film comprising a synthetic polymer, the synthetic polymer comprising a film forming polymer selected from the group of synthetic polymers capable of being crosslinked with sulfur, wherein the synthetic polymer has been crosslinked with a sulfur-replacing crosslinking agent, the crosslinking agent consisting essentially of a metal oxide, the crosslinking agent being present in the film in an amount from about 0.25 PHR to about 1 PHR.

18. A glove comprising a thin elastomeric film, said film comprising a synthetic polymer, the synthetic polymer comprising a film forming polymer selected from the group of synthetic polymers capable of being crosslinked with sulfur, wherein the synthetic polymer has been crosslinked with a sulfur-replacing crosslinking agent, the crosslinking agent consisting essentially of a metal oxide, and wherein the glove has been chlorinated.

* * * * *